US006212584B1

(12) United States Patent
Nei

(10) Patent No.: US 6,212,584 B1
(45) Date of Patent: Apr. 3, 2001

(54) SYSTEM AND METHOD FOR TRANSMITTING R-G-B SIGNALS IN A MULTI-USER COMPUTER SYSTEM

(75) Inventor: Chu-Ching Nei, Los Altos, CA (US)

(73) Assignee: Maxspeed Corporation, Palo Alto, CA (US)

(*) Notice: Subject to any disclaimer, the term of this patent is extended or adjusted under 35 U.S.C. 154(b) by 0 days.

(21) Appl. No.: 08/958,044

(22) Filed: Oct. 27, 1997

Related U.S. Application Data

(60) Provisional application No. 60/031,267, filed on Nov. 15, 1996.

(51) Int. Cl.[7] ...................................................... G06F 13/00
(52) U.S. Cl. .............................................. 710/72; 710/101
(58) Field of Search .................................. 348/6, 10, 12, 348/15, 17, 552; 455/3.1, 6.1; 370/490; 710/72, 73, 62, 64, 101, 103, 129; 709/200

(56) References Cited

U.S. PATENT DOCUMENTS

| | | | | |
|---|---|---|---|---|
| 3,798,610 | | 3/1974 | Bliss et al. | 340/172.5 |
| 4,766,402 | | 8/1988 | Crane | 333/25 |
| 4,885,747 | * | 12/1989 | Foglia | 370/123 |
| 5,241,625 | | 8/1993 | Epard et al. | 395/163 |
| 5,283,789 | | 2/1994 | Gunnarsson et al. | 370/124 |
| 5,315,711 | | 5/1994 | Barone et al. | 395/275 |
| 5,363,068 | | 11/1994 | Georger | 333/25 |
| 5,374,952 | * | 12/1994 | Flohr | 348/12 |
| 5,420,551 | | 5/1995 | Conte et al. | 333/12 |
| 5,479,617 | * | 12/1995 | Nei | 710/73 |
| 5,534,914 | * | 7/1996 | Flohr et al. | 348/15 |

OTHER PUBLICATIONS

Newton's Telecom Dictionary, pp. 516–517, Jul. 1996.*

* cited by examiner

*Primary Examiner*—Glenn A. Auve
(74) *Attorney, Agent, or Firm*—Chien-Wei (Chris) Chou; Oppenheimer Wolff & Donnelly LLP

(57) ABSTRACT

A multi-user computer system using a communications protocol in transmitting data between a plurality of user interface units is described. The system includes a base unit, which has a bus, a processor coupled to the bus, a display device coupled to the bus, an input device also coupled to the bus, and an interface controller coupled to the bus, wherein said processor controls the operation of the base unit and processes data entered into the base unit and operates to generate output data to be displayed on the display device. The system also includes an auxiliary unit, which has a protocol interface controller, a second display device coupled to the protocol interface controller, a second input device coupled to the protocol interface controller, wherein the protocol interface controller controls the operation of the auxiliary unit and interface with the base unit in accordance with a predetermined communications protocol. The system further includes a communications cable, which has a plurality of unshielded twisted-pair conductors coupled to the interface controller and the protocol interface controller for transmitting signals between said base unit and said auxiliary unit, wherein the signals to be transmitted includes data and red-green-blue (RGB) video signals, said base unit receives input data from said auxiliary unit via said communications cable and operates to generate output data to be displayed on the second display device of said auxiliary unit and transmits the output data via said communications in accordance with the predetermined communications protocol.

17 Claims, 7 Drawing Sheets

SYSTEM AND METHOD FOR TRANSMITTING R-G-B SIGNALS IN A MULTI-USER COMPUTER SYSTEM

CROSS-REFERENCE TO RELATED APPLICATIONS

Reference is made to and priority claimed from U.S. Provisional Application Ser. No. 60/031,267, filed Nov. 15, 1996, titled "Communications Protocol for a Multi-User Computer System."

BACKGROUND OF THE INVENTION

1. Field of the Invention

This invention relates to communications system generally, and more particularly to a time-division multiple-access communications protocol for use in a multi-user computer system.

2. Description of the Prior Art

A personal computer typically contains a processor, memory, storage devices, printer, etc., and is ordinarily used in a single-user environment. A personal computer may also be connected to a computer network to share common resources such as mass storage devices, printers, database, etc, with other computer systems. However, the cost of setting up and maintaining a computer network is ordinarily beyond that which a small office or a family can include within their budget. A solution is to provide an inexpensive multi-user computer system for use in a small office or home.

A multi-user computer system may accommodate the need of a networked computer system in a small office or a home. A multi-user computer system typically contains a base unit and at least one front-end unit for user interface. The base unit usually contains the typical components of a computer system, such as a processor, memory devices, and mass storage devices. It also contains input devices, such as a keyboard or a mouse, and output devices such as a monitor and a printer. The front-end units may include a display monitor, a keyboard, and a mouse. The multi-user computer system described above may substitute the network computer system for use in a family or small office, because such a multi-user system may be used by multiple users simultaneously. In such a multi-user system it is essential that the processor possess a strong processing power to accommodate the operations requested by the base unit and the front-end unit.

The personal computer industry has experienced tremendous growth in the last decade. Personal Computers are now both affordable and ubiquitous. Storage devices are more compact in size yet have a much higher storage capacity. Processors have much higher processing power than their typical usage requires and display devices are capable of displaying color video graphics instead of merely monochrome text. It is now possible to apply the multi-user concept in a personal computer system. This can be accomplished by adding to a personal computer front-end units that utilize the processor's processing power and the storage devices' storing capacity.

One of the difficulties in providing such a multi-user computer system is in transmitting the video signals from the base unit to the front-end unit. In an IBM Personal Computer compatible system, 15 signals are required to drive a color display on a color video monitor. The 15 signals include Red, Green, and Blue (RGB) colors and their respective return signals, and horizontal synchronous (H-Sync), vertical synchronous (V-Sync) and ground signals. A keyboard requires five signal lines, and a mouse requires 9 other lines. Hence, to support a front-end system that utilizes a color video display, a keyboard, and a mouse for a typical Windows environment, a minimum of 29 signal lines is required. One may use a cable to transmit all of the relevant signals from the base unit to the front-end unit. However, the RGB signals are transmitted in analog format. They need to be shielded to prevent them from interfering with other devices within its proximity. Analog signals that drive the analog monitor can only be transmitted within [its] their proximity. Hence, this limits the front-end unit's distance from the base unit.

Moreover, most of the systems utilize a cable of only a few feet in length for transmitting the video signals to the monitor. This limitation substantially restricts the location of the auxiliary unit to be within the proximity of the processor. It is desirable that auxiliary unit be located in a different room than the base unit. Hence, it is desirable that the video signals can be transmitted for a longer distance to a remote location.

SUMMARY OF THE INVENTION

It is therefore an object of the present invention to provide a multi-user computer system with a shared hardware and software, yet able to provide the user with the state-of-the-art color video graphics display in a Windows operating environment.

It is another object of the present invention to provide a simple alternative in transmitting a plurality of signals via a single transmission line. In this arrangement multiple signals may be transmitted without using multiple signal lines. The single transmission line is used by partitioning the access to the line in reference to time so that multiple sources may access the same transmission line in a different time domain.

In a specific embodiment of the present invention, a multi-user computer system using a communications protocol in transmitting data between a plurality of user interface units is described. The system includes a base unit, which has a bus, a processor coupled to the bus, a display device coupled to the bus, an input device also coupled to the bus, and an interface controller coupled to the bus, wherein said processor controls the operation of the base unit and processes data entered into the base unit and operates to generate output data to be displayed on the display device. The system also includes an auxiliary unit, which has a protocol interface controller, a second display device coupled to the protocol interface controller, a second input device coupled to the protocol interface controller, wherein the protocol interface controller controls the operation of the auxiliary unit and interfaces with the base unit in accordance with a predetermined communications protocol. The system further includes a communications cable that provides a communication pathway between the base unit and the auxiliary unit, which has a plurality of unshielded twisted-pair conductors coupled to the interface controller and the protocol interface controller for transmitting signals between said base unit and said auxiliary unit, wherein the signals to be transmitted include data and red-green-blue (RGB) video signals, said base unit receives input data from said auxiliary unit via said communications cable and operates to generate output data to be displayed on the second display device of said auxiliary unit and transmits the output data via said communications in accordance with the predetermined communications protocol.

It is an advantage of the present invention that it provides a multi-user computer environment with a shared hardware and software, and still able to provide the user with the state of the art color video graphics display in a Windows operating environment.

It is another advantage of the present invention that it provides a simple alternative to the transmission of a plurality of signals via a single transmission line to eliminate the need of connecting multiple signal lines in a communications cable by dividing the time to allow multiple sources to access the same transmission line.

The foregoing and other objects, features and advantages of the present invention will be apparent to those skilled in the art after having read the following detailed description of the preferred embodiments, which make reference to the several figures of the drawing.

IN THE DRAWINGS

DETAILED DESCRIPTION OF THE PREFERRED EMBODIMENTS

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention features a multi-user computer system having a base unit and auxiliary unit, wherein a communications protocol is used in transmitting data between the base unit and the auxiliary unit. The system includes a base unit, which has a bus, a process coupled to the bus, a display device coupled to the bus, an input device also coupled to the bus, and an interface controller coupled to the bus, wherein said processor controls the operation of the base unit and processes data entered into the base unit and operates to generate output data to be displayed on the display device. The system also includes an auxiliary unit, which has a protocol interface controller, a second display device coupled to the protocol interface controller, a second input device coupled to the protocol interface controller, wherein the protocol interface controller controls the operation of the auxiliary unit and interface with the base unit in accordance with a predetermined communications protocol. The system further includes a communications cable, which has a plurality of unshielded twisted-pair conductors coupled to the interface controller and the protocol interface controller for transmitting signals between said base unit and said auxiliary unit, wherein the signals to be transmitted include data and red-green-blue (RGB) video signals, said base unit receives input data from said auxiliary unit via said communications cable and operates to generate output data to be displayed on the second display device of said auxiliary unit and transmits the output data via said communications in accordance with the predetermined communications protocol.

In the following description, numerous specific details are set forth in order to provide a thorough understanding of the present invention. However, it will be apparent to one of ordinary skill in the art that these specific details need not be used to practice the present invention. In other circumstances, well-known structures, materials, circuits, and interfaces have not been shown or described in detail in order not to unnecessarily obscure the present invention.

Figure 1:
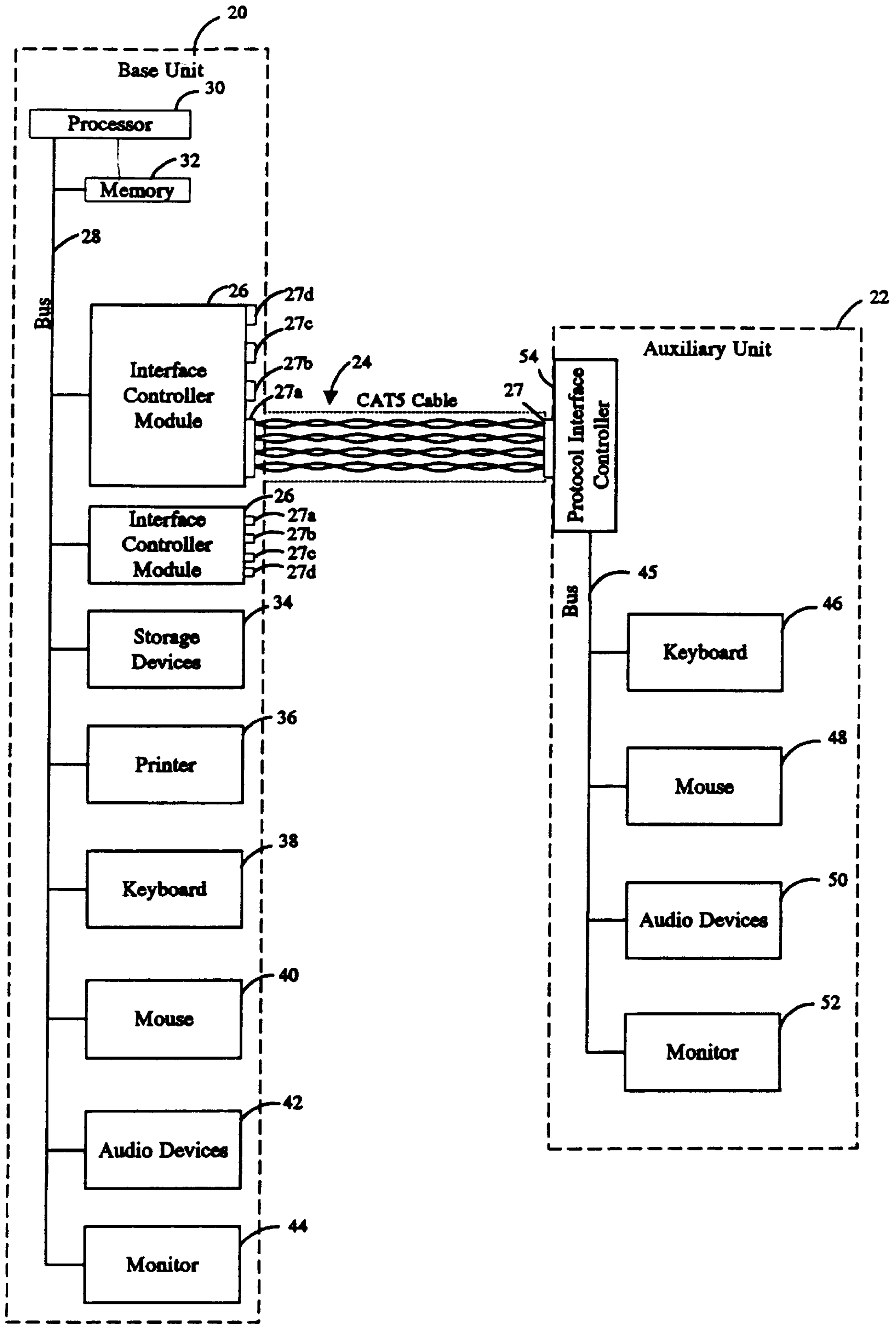
FIG. 1 is a block diagram illustrating a multi-user computer system of a presently preferred embodiment.

FIG. 1 is a block diagram illustrating a presently preferred embodiment of a multi-user computer system. The multi-user computer system includes a base unit 20 and an auxiliary unit 22. The auxiliary unit 22 is coupled to the base unit 20 via a category 5 (CAT5) communications cable 24. The end of cable 24 is coupled to an interface controller module in the base unit 20 by connecting an RJ-45 connector on cable 24 to an RJ-45 jack 27*a* on the interface controller module 26. Cable 24 is coupled to a protocol interface controller 54 in the auxiliary unit 22. Cable 24 is coupled to the protocol interface controller 54 by connecting an RJ-45 connector on cable 24 to an RJ-45 jack 27 on the protocol interface controller 54.

Base unit 20 is a computer system that has a processor 30, a memory 32, and a bus 28. Processor 30 and memory 32 are coupled to the bus 28. Memory 32 includes random access memory (RAM) and read only memory (ROM). Memory 32 is also directly coupled to the processor 30. Base unit 20 typically contains mass storage devices 34 such as a hard disk drive and a floppy disk drive, a printer 36, input devices such as a keyboard 38 or other alphanumeric input devices, and pointing devices such as a mouse 40 or a track ball, audio devices 42 for capturing audio signals such as a microphone and for playing back audio signals such as a speaker or a headphone, and a video monitor 44 or other display devices. In the presently preferred embodiment, base unit 20 also includes an interface controller module 26 which is coupled to the bus 28. All these devices are coupled to the processor 30 and memory 32 via the bus 28. The interface controller module 26 includes at least one RJ-45 jack and handles the communications to and from the auxiliary unit 22.

Auxiliary unit 22 contains a keyboard 46, a mouse 48, audio devices 50, a monitor 52, and a protocol interface controller 54. All of these devices are coupled to a bus 45 in the auxiliary unit 22. The protocol interface controller 54 includes an RJ-45 jack and controls the auxiliary unit's communications to and from the interface controller 26 of the base unit 20. The processor 30 in the base unit 20 essentially performs all the data processing for the base unit 30 and the auxiliary unit 22. The auxiliary unit 22 does not process data to be displayed on the monitor 52. Inputs from the keyboard 46 or mouse 48 of the auxiliary unit 22 are transmitted to the base unit 20 via cable 24 in accordance with a predetermined communications protocol to be described later. The communications cable 24 is coupled to the protocol interface controller 54 of the auxiliary unit 22 and the interface controller module 26 of the base unit 20. Inputs from the keyboard 46 or mouse 48 in the auxiliary unit 22 are processed by the processor 30 in the base unit 20. The base unit 20 transmits the processed data back to the auxiliary unit 22 to be displayed on the monitor 52 in the auxiliary unit 22. Signals that control the handshaking between the base unit 20 and the auxiliary unit 22 are also handled in the same manner.

RGB video signals are directly transmitted from the base unit 20 to the auxiliary unit 22 via the communications cable 24 for video to be displayed on the monitor 52 in the auxiliary unit 22. In addition to video signals and data to be displayed on the monitor 44, audio signals may also be transmitted between the base unit 20 and the auxiliary unit 22 via this communications cable 24. A microphone, which is an audio device 50, may be coupled to the bus in the auxiliary unit 22. The audio signals captured by the microphone 50 are transmitted to the base unit 20 via the communications cable 24. A speaker or a headphone, which is an audio device 50, may also be coupled to the bus 45 in the auxiliary unit 22. Audio signals may be transmitted from the base unit 20 to the auxiliary unit 22 via the communications cable 24 for playing back on the speaker of the auxiliary unit 22. In one embodiment, a plurality of interface controller modules 26 may be installed in the base unit 20 for interfacing with additional auxiliary units.

Figure 2:
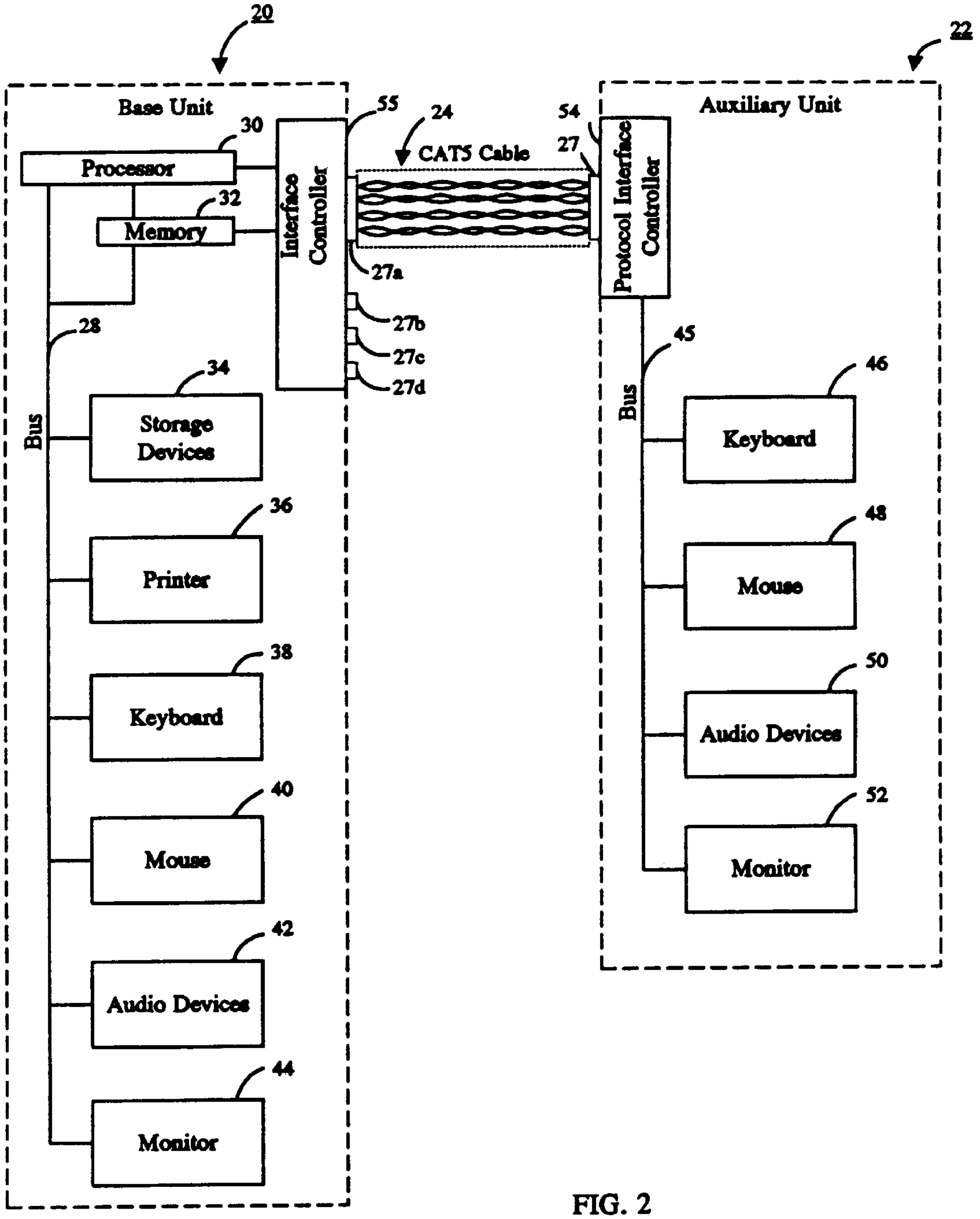
FIG. 2 is a block diagram illustrating an alternative embodiment of a multi-user computer system of the present invention.

FIG. 2 is a block diagram illustrating an alternative embodiment to the configuration illustrated in FIG. 1. In this embodiment, the interface controller 55 is embedded in the base unit 20 and is directly coupled to the processor 30 and the memory 32. This configuration eliminates the interface controller module 26 as depicted in FIG. 1.

Figure 3:
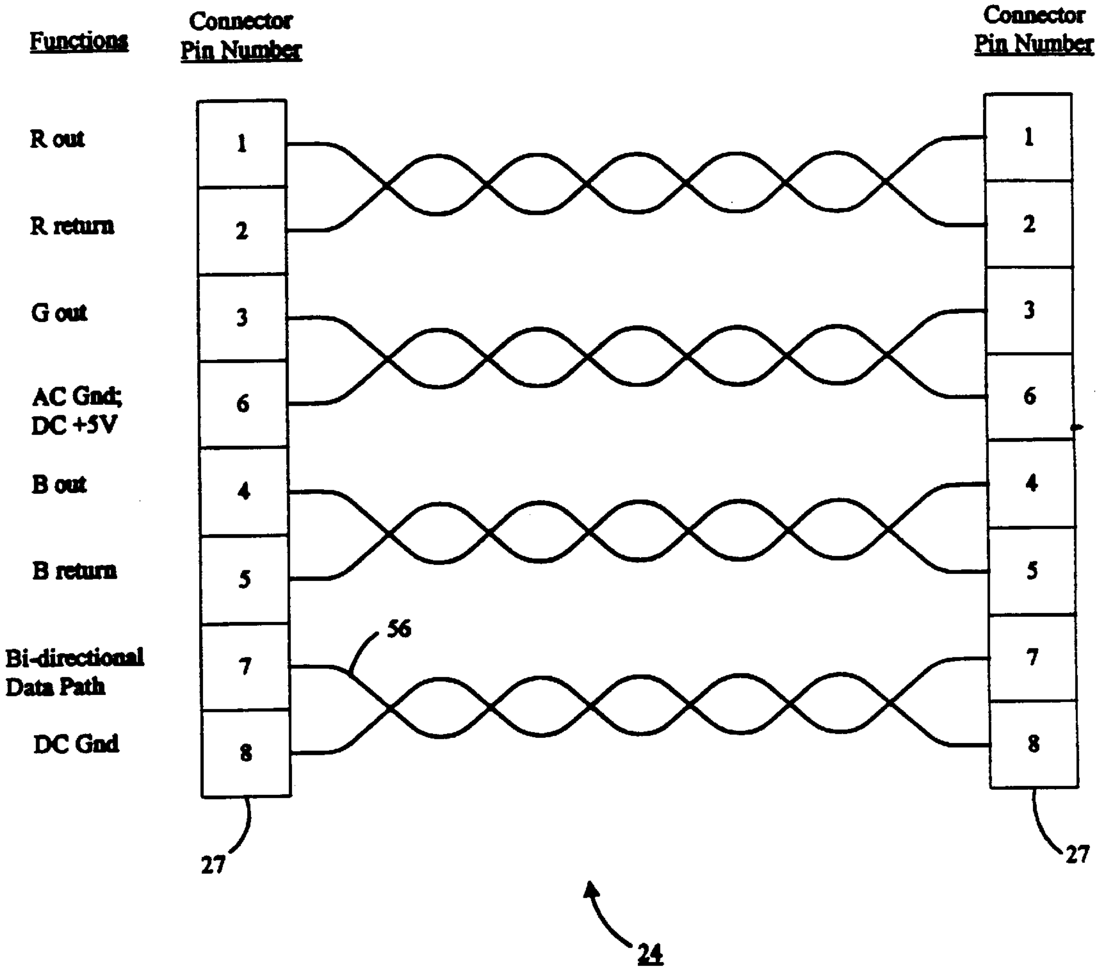
FIG. 3 is a diagram illustrating the cable assembly for connecting the auxiliary unit to the base unit of the preferred embodiment.

FIG. 3 is a diagram illustrating the configuration of the cable 24. Cable 24 is a category 5 cable having two RJ-45 connectors 27, one on each end of the cable. RJ-45 is an industrial standard connector having eight pins for connecting eight conducting wires. Category 5 (CAT5) is a data grade standard for commercial and industrial building wiring. This standard is established by the Electronic Industries Association. CAT5 cables utilize 24 gauge wires supports a four-pair, 100-ohm unshielded twisted-pair cable that is capable of transmitting signals from one through 100 megahertz [on the network]. A CAT5 cable typically has one RJ-45 connector on each end. Both the RJ-45 and CAT5 standards are well known to those of ordinary skill in the art.

The pin assignments of the RJ-45 connectors 27 of cable 24 of the preferred embodiment are illustrated in FIG. 3. The RGB color video signals are transmitted through this cable 24 from the base unit 20 to the auxiliary unit 22 of FIG. 1. One pair of wires 21, twisted together in accordance with CAT5 standard, is connected to pin-1 and pin-2 of the RJ-45 connector 27 respectively. Pin-1 is connected to the red video signal, and pin-2 is connected to the return signal of red video signal. A second pair of wires 31 is connected to pin-3 and pin-6 of the RJ-45 connector 27. Pin-3 is connected to the video green signal, and pin-6 serves two purposes: it provides the AC Ground and DC +5V. The DC +5V output turns into AC Ground after decoupling, wherein the AC is a loop with respect to digital signals. The +5V supplies the required power to the circuitry in the auxiliary unit 22. Wires coupled to pin-3 and pin-6 are twisted together according to CATS specification. A third pair of wires 41 is connected to pin-4 and pin-5 of the RJ-45 connector respectively. Pin-4 is coupled to the video blue signal and pin-5 is coupled to the video blue return signal. A fourth pair of wires 51 is connected to pin-7 and pin-8 of the RJ-45 connector 27 respectively. Wires coupled to pin-4 and pin-5 are twisted together in accordance with CAT5 specification. Pin-7 is a bi-directional data path for transmitting data between the base unit 20 and the auxiliary unit 22. Pin-8 provides the DC Ground signal to the auxiliary unit 22. Wires coupled to pin-7 and pin-8 are twisted together as a pair that comply with the CAT5 specification.

All of the signals related to the keyboard, mouse, and audio are transmitted via the single bi-directional signal line connected to pin-7 of the RJ-45 connector 27. This line is identified as data transmission line 56 in FIG. 3. The RGB video signals also require horizontal sync (H-sync) and vertical sync (V-sync) signals to control the video display. These sync signals are also transmitted via the data transmission line 56. As described above, in order to transmit RGB video signals and keyboard, mouse and data, a minimum of 29 signal lines is required. In the preferred embodiment, only eight lines are used to transmit all the required signals to support video, keyboard interface, mouse interface and data. Hence, this invention provides a novel application utilizing this CAT5 cable 27 in transmitting the video signals and data signals.

In addition to video signals, information to be displayed on the auxiliary unit 22 is transmitted from the base unit 20 to the auxiliary unit 22 via the data transmission line 56. Data packet is transmitted from one unit to the other in a bit-by-bit sequence via the data transmission line 56 of cable 24. The technique used in transmitting one data bit at a time is known to those skilled in the art as transmitting a serial stream. The data packet is disassembled by the initiating unit before transmission. The receiving unit reassembles the data bits as they are received or after all the bits are received. The process of disassembling and reassembling data packet is well known to those skilled in the art.

Figure 4:
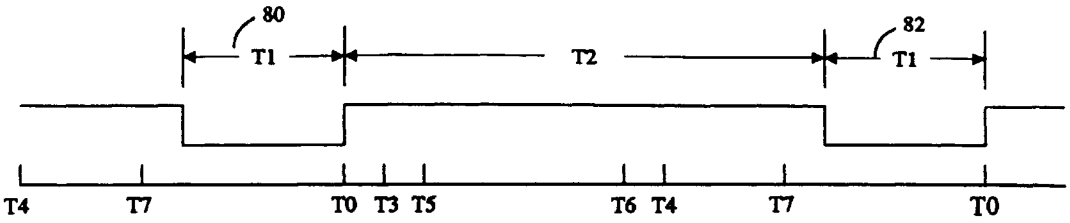
FIG. 4 is a timing diagram illustrating a communications protocol of the presently preferred embodiment where a single communications line is used for transmitting data between a base unit and an auxiliary unit.

In the preferred embodiment of this invention, the data transmission line 56 is utilized as a time-division multiple-access line, which means multiple hosts may access the line for data transmission, but such access is limited to be within a certain time period. In the preferred embodiment, the data transmission line 56 of cable 22 is utilized for transmitting data from the base unit 20 to the auxiliary unit 22 as well as for transmitting data from the auxiliary unit 22 to the base unit 20 through a time division mechanism illustrated in FIG. 4. In FIG. 4, time period T1 is allocated for the base unit 20 to transfer data to the auxiliary unit 22. Time period T2 is primarily allocated for the auxiliary unit 22 to upload data to the base unit 20, and secondarily for the base unit 20 to download the optional audio data to the auxiliary unit 22. This process will become apparent in the following description. Time period T3 to T5 is reserved as a turn-around cycle to avoid contention. The turn-around cycle between T3 and T5 allows the signal to become stabilized after the base unit 20 deasserts the signal on the data transmission line 56 and before the auxiliary unit 22 begins driving the line 56. Time period T0 to T3 is additional time for the base unit 20 to relinquish control over transmission line 56. In the preferred embodiment, time periods T3 and T5 may overlap with time periods T0 and T3. The auxiliary unit 22 drives transmission line 56 for the time period between T5 and T6, if it has information to transmit to the base unit 20. Time period T6 to T4 is reserved as turn-around cycle. Here, in this turn-around cycle the auxiliary unit 22 relinquishes control over transmission line 56 before base unit 20 may begin driving line 56. The base unit 20 regains control over transmission line 56 beginning at time T4 until time T0.

Figure 5:
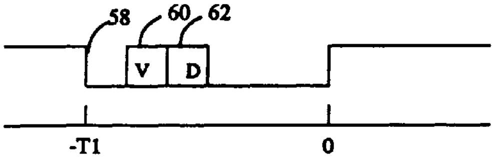
FIG. 5 is a timing diagram depicting a communications protocol for transmitting data from a base unit to an auxiliary unit of the preferred embodiment.

As is illustrated in FIG. 5, in time period T1, from time −T1 to T0, base unit 20 transmits an H-sync 58 signal at time −T1. The assertion of H-sync 58 at time −T1 indicates that valid data will follow in a predetermined time period thereafter until time T0. In the T1 time period of FIG. 4, following the H-sync 58 signal, base unit 20 transmits V-sync 60 and one data 62 bit after a predetermined time period, respectively. The time to transmit the V-sync 60 and data 62 is determined by a state machine (not shown in the drawing). One bit of data will be transmitted at the expiration of the predetermined time period after transmitting the V-sync 60 signal. Auxiliary unit 22 neither captures nor interprets signals on transmission line 56 until it receives an H-sync 58 signal. The entire data transmission is synchronized to the H-sync signal. Base unit transmits V-sync 60 and data 62 after the H-sync 58. When auxiliary unit 22 in FIG. 1 detects the H-sync 58, it captures in the V-sync 60 and data 62 in accordance with the predetermined time period.

Figure 6:
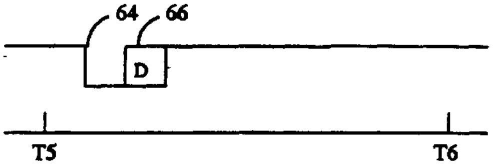
FIG. 6 is a timing diagram showing a communications protocol for transmitting data from an auxiliary unit to a base unit of the preferred embodiment.

FIG. 6 is a timing diagram illustrating the timing of transmitting data from auxiliary unit 22 to base unit 20. Auxiliary unit 22 controls transmission line 56 between times T5 and T6. Valid transmission starts with a start-bit or sync-bit 64. A data bit 66 is transmitted after a predetermined period of time after transmitting the sync-bit 64. Similar to base unit 20, the time for auxiliary unit 22 to transmit the data 66 is also determined by a state machine. In order to avoid decoding invalid data, base unit 20 does not decode the signals on transmission line 56 until it receives the sync 60 signal.

Figure 7:
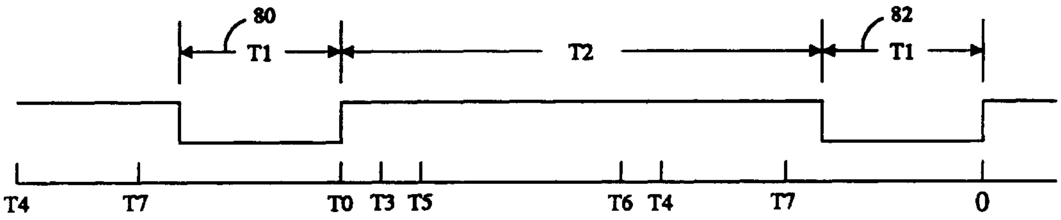
FIG. 7 is a timing diagram illustrating a communications protocol of the preferred embodiment where a single communications line is used to transmit data between a base unit and an auxiliary unit.

In addition to transmitting video, keyboard, or mouse-related data on the data transmission line 56, an audio signal may also be transmitted through this data transmission line 56 as is illustrated in FIGS. 7–10. FIG. 7 is similar to FIG. 4, except for the time period T4–T7. In this alternative, audio signals may be transmitted from the base unit 20 to the auxiliary unit 22 from time T4 to T7.

Figure 8:
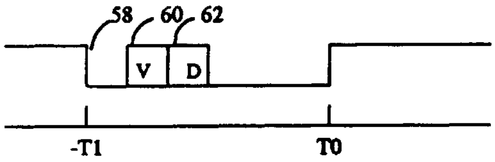
FIG. 8 is a timing diagram depicting a communications protocol for transmitting data from a base unit to an auxiliary unit of the preferred embodiment.

FIG. 8 is identical to FIG. 5, which shows the transmission of H-sync 58, V-sync 60, and data 62 from the base unit 20 to the auxiliary unit 22.

Figure 9:
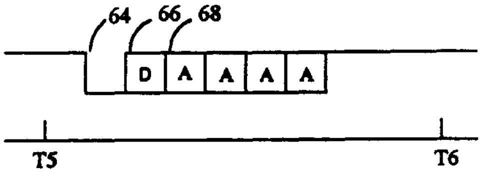
FIG. 9 is a timing diagram depicting a communications protocol for transmitting data and audio signals from an auxiliary unit to a base unit of the preferred embodiment.

FIG. 9 illustrates the transmission from the auxiliary unit 22 to the base unit 20. In this embodiment, audio signals 68 are transmitted after the sync 64 signal and the data 66 bit. The data 66 and audio signals 68 are transmitted at a predetermined time period interval one bit at a time as is described above. The audio signals 68 input from the auxiliary unit 22 are for recording the audio signals captured by audio devices 50. One example of an application of this function in a teleconferencing system, in which audio signals are picked up at an auxiliary unit 22 through a microphone and transmitted to a remote system through the processor 30 in the base unit 20 for recording.

Figure 10:
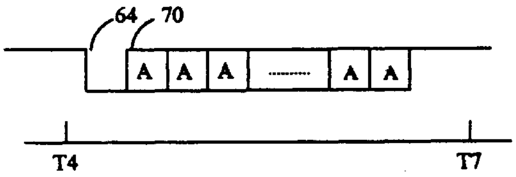
FIG. 10 is a timing diagram illustrating a communications protocol transmitting audio signals from a base unit to an auxiliary unit of the preferred embodiment.

FIG. 10 illustrates the transmission of audio signals 70 from the base unit 20 to the auxiliary unit 22. In the preferred embodiment, the transmission begins with a sync signal 64, followed with a series of audio signals 70. The audio signals are transmitted based on a predetermined time period controlled by a state machine. The transmission of the audio signals is completed before time T7. After time T7, the base unit 20 may start the next cycle by transmitting an H-sync 58 at time −T1, and V-sync 60, data bits 62 as is illustrated in FIG. 8.

Figure 11:
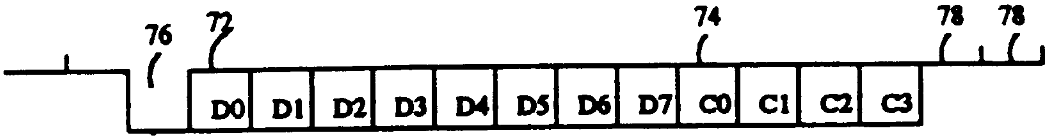
FIG. 11 is a diagram depicting a communications data packet transmitted from a base unit to an auxiliary unit of the preferred embodiment.

FIG. 11 illustrates a data packet transmitted from the base unit 20 to the auxiliary unit 22. In one embodiment, this data packet includes eight data bits 72 (Do–D7), and four command bits 74 (Co–C3). In other embodiments the data is in 16 bits, 32 bits, or other width. Likewise, in some embodiments the command has other widths, such as two bits, 8 bits, etc., as the need dictates. Before transmitting the data packet, the base unit adds one start bit 76 at the beginning and two stop bits 78 at the end of each data packet. The start bit 76 indicates that the data packet will be transmitted following this start bit 76. The two consecutive stop bits 78 indicate that the packet terminates after the stop bits 78. As indicated above, this data packet is disassembled before transmission. Each of the bits in the data packet, as well as the start 76 and stop bits 78, is transmitted in accordance with the mechanism described in FIGS. 4, 5, 7 or 10. For example, each bit is transmitted during the time period one bit at a time, such as during the first T1 cycle 80 as is shown in FIG. 4. As is illustrated in FIG. 5, the actual transmission sequence begins with an H-sync 58 at time T1, followed by a V-sync 60 and one data bit 62. In this example, the data bit 62 would be the start bit 76 as shown in FIG. 11. At the second T1 cycle 82, as illustrated in FIG. 4, contains H-sync 58, V-sync 60, and data 62. The data 62 is DO as shown in FIG. 11. This operation continues until the entire data packet, as illustrated in FIG. 11, and the two stop bits 78 are transmitted. The protocol interface controller 54 of the auxiliary unit 22 then reassembles the data packet received and executes the transmitted information.

Figure 12:
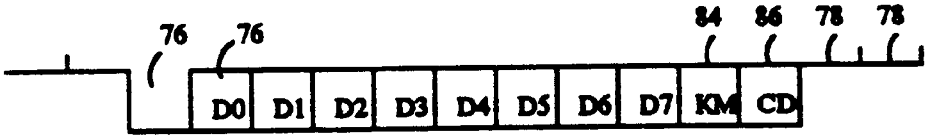
FIG. 12 is a diagram illustrating a communications data packet transmitted from an auxiliary unit to a base unit of the preferred embodiment.

The data packet transmitted from the auxiliary unit 22 to the base unit 20 is illustrated in FIG. 12. The data packet is first disassembled into bit format and includes a start bit 76 at the beginning and two stop bits 78 at the end of the packet. The transmission sequence is illustrated in FIG. 6, which includes a sync bit 64 followed by a data bit 66, and a series of audio signals 68, if available, as is illustrated in FIG. 9. The data packet includes a keyboard/mouse bit 84, and a command bit 86. The keyboard/mouse bit 84 identifies the device associated with the data packet. Although one bit is defined in this illustration, more bits are utilized if more devices are implemented in the auxiliary unit 22. Likewise, although only one bit is illustrated for the command field, more bits are utilized for larger commands. In one embodiment, the data and the command is user data or a type of command or response message indicating that an action needs to be performed by the base unit 20, such as read, write, open or close a file, etc.

Figure 13:
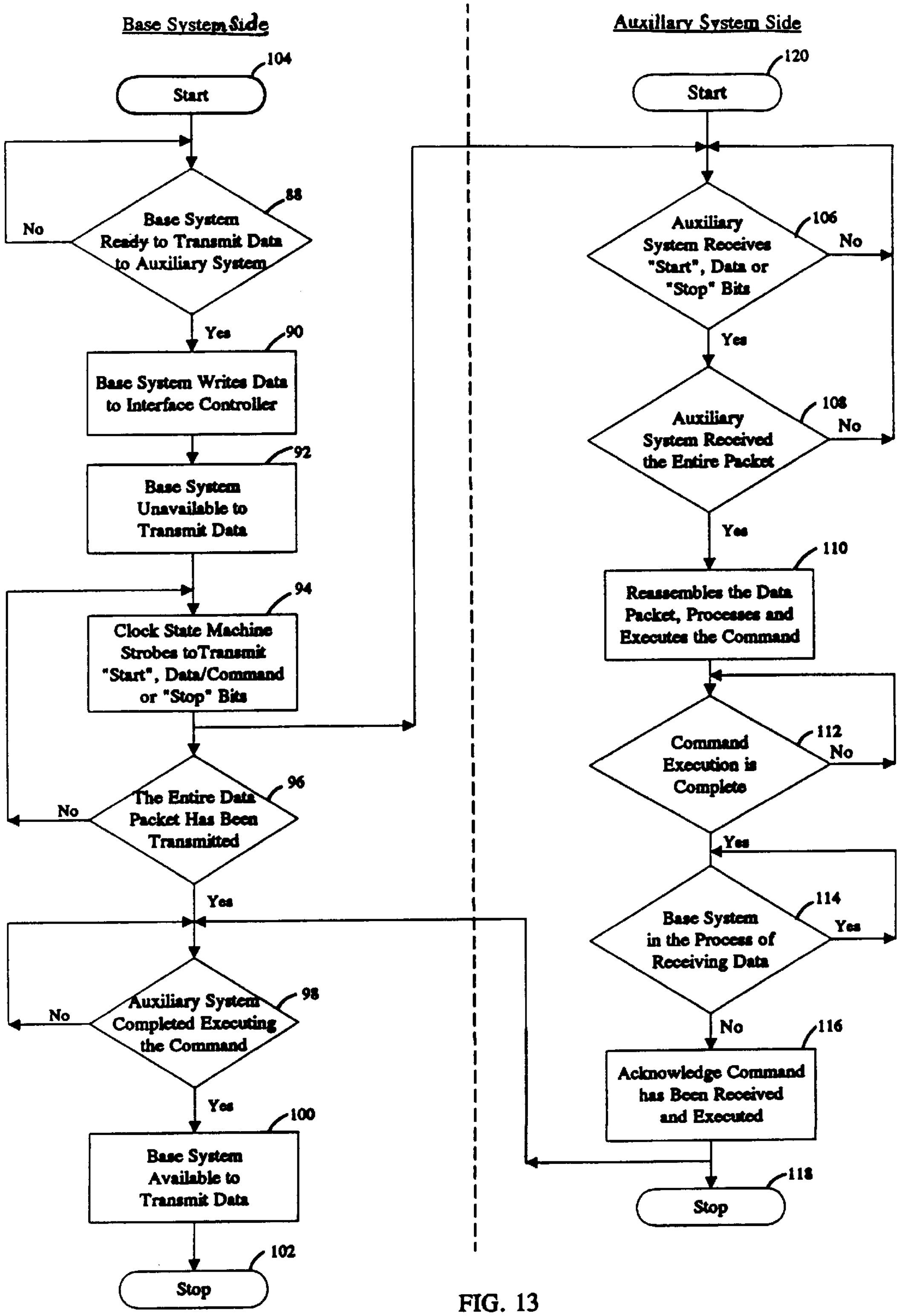
FIG. 13 is a flow diagram illustrating the communications operation between a base unit and an auxiliary unit in a multi-user system of the preferred embodiment, where the base unit initiates the communication.

FIG. 13 is a flow diagram illustrating the communications operation between the base unit 20 and the auxiliary unit 22 in a multi-user system of the presently preferred embodiment, where the base unit 20 initiates the communication. The base unit first checks if it is ready to transmit data to the auxiliary unit (step 88), which could be, for example, setting an output ready flag. This operation continues until the base unit is ready to transmit. The base unit is not ready to transmit data to auxiliary unit if it is in the middle of transmitting a packet of data. For example, when the base unit is in the middle of transferring a data packet illustrated in FIG. 11, it cannot start transferring another data packet. The base unit must wait until it completes transferring the first data packet before it can start transferring a second data packet. Once the base unit is available to transmit data, it writes the data into the interface controller module 26 (step 90) and indicates that the base unit is no longer available for transmitting any other data packet (step 92) by resetting the output ready flag, because it is committed to transferring the current data packet. A clocked state machine controls when the base unit may transmit each individual data bit in the data packet to the auxiliary unit (step 94). The clocked state machine first transmits the start bit of the packet, followed by the data bits. The data bits described here include the data in the data field and data in the command field or other applicable fields. The process of transmitting the data is continued until the entire packet, including the command and the two stop bits, is transmitted (step 96). After the entire data packet and command is transmitted, the base unit awaits acknowledgment from the auxiliary unit that indicates that the command has been executed (step 98). Once such acknowledgment is received, the base unit indicates that it is available to transmit another data packet (step 100) by setting the output ready flag. The process for one series of transmission terminates (step 102) and waits for another series of transmission to begin by looping back to the start (step 104).

Concurrently, the auxiliary unit 22 monitors whether or not it has received a start bit (step 106). After the auxiliary unit has received a start bit, it continues to receive the data and the stop bits. The base unit 20 and the auxiliary unit 22 operate on independent clocks, and the clocks need not be synchronized or have the same frequency. The only requirement is that the data be transmitted and received at the same baud rate. The auxiliary unit 22 reassembles the data received and executes the command (step 110) once the entire data packet and command is received (step 108). The auxiliary unit 22 waits until the command is executed (step 112) then checks if the base unit is in the process of receiving data (step 114). The auxiliary unit 22 acknowledges that the data or command has been received and executed (step 116) if the base unit 20 is available to receive data from the auxiliary unit 22. The receiving process of the auxiliary unit 22 terminates after transmitting the acknowledgment.

Figure 14:
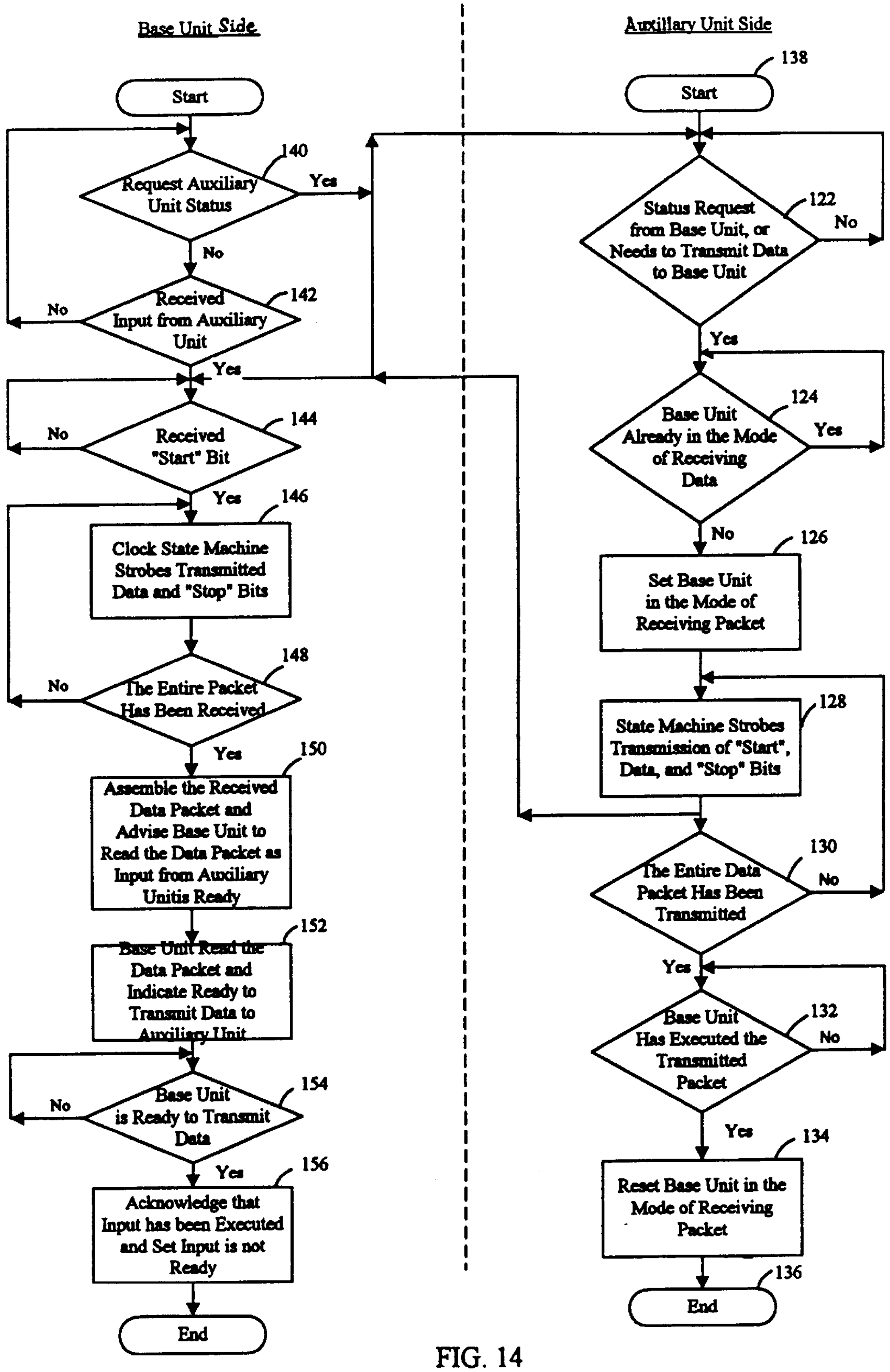
FIG. 14 is a flow diagram illustrating the communications operation between a base unit and an auxiliary unit in a multi-user system of the present invention, where the auxiliary unit initiates the communication.

FIG. 14 is a flow diagram illustrating communications between the base unit and the auxiliary unit in a multi-user system of the presently preferred embodiment, where the auxiliary unit initiates the communication. The auxiliary unit 22 first checks if it needs to transmit any data to the base unit 20 or respond to a status request (step 122). If it does, then it checks if the base unit 20 is unavailable to receive data from the auxiliary unit 22, i.e., the base unit 20 is already engaged in receiving a data packet from the auxiliary unit (step 124). The auxiliary unit 22 reserves the base unit 20 for this communication (step 126) if the base unit 20 is available to receive data by setting a base unit busy flag. The auxiliary unit 22 begins to strobe the start, data, and stop bits out (step 128), until the entire data packet and command has been transmitted (step 130). The auxiliary unit 22 awaits the acknowledgment from base unit 20 that the command has been executed (step 132), then resets the base unit busy flag which allows the auxiliary unit 22 to upload another data packet (step 134).

On the base unit side, the interface controller 26 waits until it has requested the auxiliary unit to advise of its status (step 140) or received input from the auxiliary unit (step 142). Once it has received the start bit (step 144), the interface controller initializes or increments an input state machine, and a clocked state machine strobes in the data at the same rate as data are transmitted from the auxiliary unit (step 146), until the entire data packet and command has been received (step 148). The input state machine maintains control over which bit of the data packet is to be transmitted. After the data packet has been received, the interface controller 26 reassembles the packet and informs the base unit to read the data packet as the data from the auxiliary unit are available for processing (step 150). Once the base unit reads the data packet, it advises the interface controller 26 that it is ready to transmit data to the auxiliary unit (step 152). When the interface controller receives the message indicating that the base unit is ready to transmit data (step 154), it sends acknowledgment to the auxiliary unit that the data transmitted have been processed. In addition, the interface controller 26 also indicates that no data have been transmitted from the auxiliary unit (step 156) by resetting the input ready flag.

While the invention has been particularly shown and described with reference to the preferred embodiments, it will be understood by those skilled in the art that many other modifications and variations may be made thereto without departing from the broader spirit and scope of the invention as set forth in the claims. The specification and drawings are accordingly to be regarded as an illustrative, rather than in a restrictive sense.

What is claimed is:

1. A multi-user computer system comprising:

a base unit including a processor, and an interface controller coupled for communication with said processor;

an auxiliary unit including a first bus, an auxiliary display device coupled to said bus, at least one input device coupled to said bus, and an interface protocol controller coupled to said bus, said auxiliary unit being operative to develop input data signals in response to input received via said input device; and a communications cable coupled to provide communication between said interface controller and said protocol controller, said cable including a plurality of unshielded twisted-pair conductors for carrying analog red, green, and blue video signals (RGB signals) and horizontal and vertical sync signals to said auxiliary unit and for carrying data signals, including input data signals, between the base and auxiliary unit, said data signals being encoded with said horizontal and vertical sync signals, said RGB signals and horizontal and vertical sync signals providing for display of information on said auxiliary display device.

2. The multi-user computer system of claim 1, wherein:

said interface controller and said protocol interface controller each include an RJ-45 jack; and said communications cable includes two RJ-45 connectors, each being coupled to a corresponding end of said cable, said connectors being provided for coupling said cable with said jacks.

3. The multi-user computer system of claim 1, wherein said communications cable further comprises:

a first connector and a second connector each having eight connector pins;

a first twisted pair of conductors coupling first and second pins of said first connector to corresponding first and second pins of said second connector;

a second twisted pair of conductors coupling third and sixth pins of said first connector to corresponding third and sixth pins of said second connector;

a third twisted pair of conductors coupling fourth and fifth pins of said first connector to corresponding fourth and fifth pins of said second connector;

a fourth twisted pair of conductors coupling seventh and eighth pins of said first connector to corresponding seventh and eighth pins of said second connector;

said first, third, and fourth pins of said first conductor providing for transmission of red, green, and blue analog-out video signals respectively;

said second and fifth pins of said first conductor providing for transmission of red and blue analog-return video signals respectively;

said sixth pin of said first conductor providing an AC ground reference and DC power to said auxiliary unit;

said seventh pin of said first conductor providing for transmission of data and horizontal and vertical sync signals between said base unit and auxiliary unit; and said eighth pin of said first conductor providing a DC ground reference for said auxiliary unit.

4. The multi-user computer system of claim 1, wherein said input device includes a keyboard.

5. The multi-user computer system of claim 1, wherein said input device includes a pointing device.

6. The multi-user computer system of claim 5, wherein said pointing device is a mouse.

7. The multi-user computer system of claim 1, wherein said interface controller is an interface module coupled to said processor via a bus.

8. The multi-user computer system of claim 1, wherein said base unit further comprises a memory unit and wherein said interface controller is directly coupled to said processor and said memory unit.

9. The multi-user computer system of claim 1, wherein said base unit and said auxiliary unit communicate via said cable in accordance with a protocol wherein:

during a first time period, said base unit is operative to transmit a first signal indicating the beginning of transmission of a serial stream, and is also operative to transmit data in said serial stream one bit at a time separated by a predetermined period of time until all of the data in said stream is transmitted; and during a second time period, said auxiliary unit is operative to transmit a second signal indicating the beginning of transmission of a second serial stream, and is also operative to transmit data in said second serial stream one bit at a time separated by a predetermined period of time until all of said data in said second serial stream has been transmitted.

10. The multi-user computer system of claim 9, wherein, during a third time period, said base unit is operative to transmit a third signal indicating the beginning of transmission of a third serial stream, and is also operative to transmit data in said third serial stream one bit at a time separated by a predetermined period of time until all of the data in said third stream is transmitted, said third stream including audio signals.

11. The multi-user computer system of claim 10, wherein said third signal comprises a second plurality of signals, said second plurality of signals including a plurality of audio signals.

12. The multi-user computer system of claim 9, wherein during a third time period, occurring between said first time period and said second time period, said base unit and said auxiliary unit both relinquish control over said cable.

13. A method of providing an auxiliary computer user interface via an auxiliary unit coupled to communicate with a base computer including a processor, and an interface controller coupled to said processor, the auxiliary unit including a bus, an auxiliary display device coupled to said bus, at least one auxiliary input device coupled to said bus, and an interface protocol controller coupled to said bus, said protocol controller being coupled with said interface controller via a communications cable, said method comprising the steps of:

developing input data signals at said auxiliary unit in response to input received via said input device;

transmitting said input data signals from said auxiliary unit to said base computer via said cable;

developing analog red, green, and blue video signals (RGB signals) at said base computer in response to said input data signals;

transmitting said RGB signals from said base computer to said auxiliary unit via said cable; and displaying information on said auxiliary display device in response to said RGB signals.

14. A method of providing an auxiliary computer user interface as recited in claim 13, further comprising the step of transmitting horizontal sync signals and vertical sync signals from said base computer to said auxiliary unit via said cable, said horizontal sync signals and said vertical sync signals providing for control of said auxiliary display device.

15. A method of providing an auxiliary computer user interface as recited in claim 13, wherein said step of transmitting said input data signals from said auxiliary unit to said base computer includes, during a first time period:

transmitting a signal indicating the beginning of transmission of a serial stream, and transmitting input data in said serial stream one bit at a time separated by a predetermined period of time until all of said data in said serial stream has been transmitted.

16. A method of providing an auxiliary computer user interface as recited in claim 15, wherein said auxiliary further includes a speaker; and wherein said method further comprises the steps of:

transmitting audio signals from said base computer to said auxiliary unit during a second time period, said step of transmitting audio signals including:

transmitting a first signal from said base computer to said auxiliary unit, said first signal indicating the beginning of transmission of a serial stream, and transmitting audio data in said serial stream one bit at a time separated by a predetermined period of time until all of the data in said stream is transmitted; and generating sounds using said speaker in response to said audio signals.

17. A computer system having a remote user station, the system comprising:

a base unit including a processor and an interface controller coupled for communication with said processor;

an auxiliary unit including an auxiliary display device, at least one input device, and an interface protocol controller for sending to and receiving information from the base unit, the information received for display on the auxiliary display device, and the information sent derived from the at least one input device; and a communications cable coupled to provide communication between said interface controller and said protocol controller, said cable including a plurality of unshielded twisted-pair conductors for carrying analog red, green, and blue video signals (RGB signals) and horizontal and vertical sync signals to said auxiliary unit and for carrying data signals, including input data signals, between the base and auxiliary unit, said data signals being encoded with said horizontal and vertical sync signals, said RGB signals and horizontal and vertical sync signals providing for display of information on said auxiliary display device.

* * * * *